US008379497B2

(12) United States Patent
Kikugawa

(10) Patent No.: US 8,379,497 B2
(45) Date of Patent: Feb. 19, 2013

(54) OPTICAL DISK APPARATUS

(75) Inventor: Atsushi Kikugawa, Tokyo (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 329 days.

(21) Appl. No.: 12/572,354

(22) Filed: Oct. 2, 2009

(65) Prior Publication Data

US 2010/0085858 A1 Apr. 8, 2010

(30) Foreign Application Priority Data

Oct. 2, 2008 (JP) ................................. 2008-257808

(51) Int. Cl.
*G11B 20/20* (2006.01)
(52) U.S. Cl. ............... 369/47.28; 369/47.48; 369/47.17; 369/47.3; 369/124.01
(58) Field of Classification Search .................. None
See application file for complete search history.

(56) References Cited

U.S. PATENT DOCUMENTS

| 5,559,607 | A | 9/1996 | Bae | |
|---|---|---|---|---|
| 2002/0012308 | A1 | 1/2002 | Tonami | |
| 2004/0095862 | A1* | 5/2004 | Nakajima et al. | 369/47.28 |
| 2004/0114912 | A1* | 6/2004 | Okamoto et al. | 386/114 |
| 2005/0254376 | A1* | 11/2005 | Yoon et al. | 369/47.48 |
| 2007/0053262 | A1* | 3/2007 | Kikugawa et al. | 369/47.28 |
| 2009/0196318 | A1* | 8/2009 | Uchida | 372/45.01 |
| 2009/0196381 | A1* | 8/2009 | Yamamoto | 375/341 |

FOREIGN PATENT DOCUMENTS

| CN | 1127408 | 7/1996 |
|---|---|---|
| CN | 1337700 | 2/2002 |
| CN | 1648887 | 8/2005 |
| JP | 2007-073147 | 3/2007 |
| WO | WO 2007/141928 | 12/2007 |
| WO | WO2008102475 | * 8/2008 |

OTHER PUBLICATIONS

Akira Arimoto, et al., Noise Reduction of Diode Laser Video Disc Players with High Frequency Current Superposition, Apr. 24, 1985; p. 377-384.
Frank Op't Eynde, Analog Interfaces for Digital Signal Processing Systems; The kluwer International Series in Engineering and Computer Science; Kluwer Academic Publishers, p. 90-93.
Atsushi Kikukawa, Novel HF-pulse read signal converter for increasing read signal SNR, Central Research Lab, Hitachi Ltd., pp. 302-303; atsushi.kikukawa.vk@hitachi, com.
Floyd M. Gardner, Interpolation in Digital Modems-Part I: Fundamentals; IEEE Transactions on Communication, vol. 41, No. 3 Mar. 1993.

* cited by examiner

*Primary Examiner* — Joseph Haley
*Assistant Examiner* — Ifedayo Iluyomade
(74) *Attorney, Agent, or Firm* — Antonelli, Terry, Stout & Kraus, LLP.

(57) ABSTRACT

Analog components whose characteristics greatly differ from one another are removed as much as possible from an optical disc drive. Provided are means 38, 39 for changing the sampling frequency of a pulsed read signal to a different frequency, means 40, 41 for changing the modulation clock frequency by the same ratio as the sampling frequency, and means for automatically setting the sampling frequency changing means and the modulation clock changing means based on the channel clock.

18 Claims, 14 Drawing Sheets

OPTICAL DISK APPARATUS

BACKGROUND OF THE INVENTION

1. Field of the Invention

The present invention relates to a reading technique of an optical disc drive.

2. Description of the Related Art

Although the scope of application of the present invention is not limited to Blu-ray Discs (BDs), the following description is mainly based on the application to BD, and the terminology used hereinafter is basically the same as that used for BD.

Most current optical disc apparatuses such as BDs employ a high-frequency (HF) wave superimposition method to suppress noise generated by a laser diode, which is used as the light source thereof. This technique is disclosed in Non-Patent Document 1 and is well known for those skilled in the art. Therefore, the following description contains only essential features and not details.

When a laser beam reflected from a disc enters a laser diode being oscillated, the oscillation state becomes unstable, and thus producing significant laser noise. In order to avoid this, a high-frequency (HF) wave superimposition method is used. In this method, a high-frequency signal is superimposed on the drive signal of the laser diode and the laser is made to perform pulse emission. The emission waveform is a cyclic pulse as shown in FIG. 2. In this case, the laser pulse interval (modulation frequency) and the ratio of the emission period to this (duty) are the parameters that are adjusted to minimize the laser noise. That is, the frequency and the duty are determined so that a laser pulse reflected from a disc would not enter the laser diode being oscillated.

A pulsed laser beam is focused onto a recording layer of the optical disc. Then, the amplitude of the laser pulse is modulated because the intensity of the reflected laser beam differs depending on whether the portion irradiated with the laser beam is a mark or space. Provided that the bandwidth limitation due to a photodiode for reading and a current to voltage converter amplifier is nil, the read signal waveform will be a shape like the one shown in FIG. 3. Hereinafter, a signal composed of such a read pulse train will be referred to as a pulsed read signal. The dashed line in FIG. 3 is the read signal waveform obtained when the laser is continuously oscillated at the same output as the peak of the laser pulse during high-frequency superimposition. That is, the shape of the upper envelope of the pulsed read signal is a read signal waveform based on a continuous light beam. Accordingly, by envelope detection, that is, by passing the pulsed read signal through a low-pass filter having a cut-off frequency that is sufficiently lower than the frequency of the superimposed high-frequency current, it is possible to obtain a desired read waveform. In current optical disc apparatuses, this is achieved by the bandwidth limitation of a system including a photodetector and a current to voltage converter amplifier, and an analog equalizer.

Pulsing a read signal is equal to a kind of amplitude modulation. Thus, a line-like spectrum of a superimposed high-frequency signal as well as modulated read signal components in the vicinity thereof is observed. Accordingly, in this specification, the superimposed high-frequency signal will be simply referred to as a carrier. To give an example of a carrier frequency, approximately 400 MHz is normally used in the case of BD. This is entirely determined according to the optical path length of the reading optical system, so it is thought that there is not a big difference between apparatuses.

FIG. 4 shows an example of a spectrum of a pulsed read signal. The dashed line in FIG. 4 schematically represents the bandwidth limitation by the system including the photodetector and the current to voltage converter amplifier, and the analog equalizer. That is, converting a pulsed read signal into a continuous signal with the aforementioned conventional method could result in the attenuation of all harmonic components. Thus, the amplitude of the obtained read signal becomes small and the ratio of the amplitude to the pulsed read signal amplitude is approximately equal to the pulse duty.

As a technique for improving the reduction of SNR resulting from a decrease in the obtained amplitude as described above, there is known MTD (Multi-tone demodulation). Such a technique is disclosed in detail in Patent Document 1, and is also described in Non-Patent Document 3. With MTD, it is possible not only to compensate for the read signal SNR but also to solve a problem that separation of a read signal and carrier becomes difficult when high-speed reading is performed as detailed in Patent Document 1. That is, a signal obtained by MTD fundamentally contains no line-like spectrum of carriers.

In recent years, it has been known by those skilled in the art that a digital scheme such as a PRML (partial response most-likely) method is the mainstream read signal processing of optical discs. In such a signal processing system, a PLL (phase locked loop) circuit for synchronizing the clock of a read signal with the clock of the signal processor is typically digitized. However, in practice, such a digitized PLL includes a plurality of analog components such as a voltage controlled oscillator and a DAC (digital to analog converter). The use of analog components is problematic in that the characteristics thereof can easily vary. Thus, in recent years, signal processing systems that include no analog components have been studied as described in Non-Patent Document 4.

[Patent Document 1] JP Patent Publication (Kokai) No. 2007-73147 A

[Non-Patent Document 1] *"Optics"* Vol. 14, No. 5, pp. 377-383

[Non-Patent Document 2] Frank Op't Eynde, Willy Sansen, *"Analog Interfaces for Digital Signal Processing Systems"*, Kluwer Academic Publishers, 1993 Boston/Dordrecht/London, pp. 91-92

[Non-Patent Document 3] Atsushi Kikukawa, Hiroyuki Minemura, *"Novel HF-pulse read signal converter for increasing read signal SNR"*, Digest of International Symposium on Optical Memory 2007, pp. 302-303

[Non-Patent Document 4] Floyd M. Gardner, *"Interpolation in Digital Modems—Part I: Fundamentals"*, IEEE Transactions on Communications, Vol. 41, pp. 501-507 (1993)

SUMMARY OF THE INVENTION

FIG. 5 shows a configuration example of an apparatus that executes MTD. It should be noted that portions that are not necessary for the following description are omitted from FIG. 5. This example is characterized in that a pair of an ADC (analog to digital converter) 11 and a DAC (digital to analog converter) 12 is used as means for converting a pulsed read signal into a continuous waveform.

A carrier is generated by an oscillator 15 and then inputted to a laser driver 14. The laser driver 14 generates a laser drive current by which the desired average laser power, peak power, and duty can be obtained, and inputs it to a laser diode 6. The laser driver 14 also controls the laser drive current such that the average laser output becomes constant. The output beam intensity of the laser diode changes with time as shown in FIG. 2.

The laser beams are transformed into parallel beams by a collimator lens 5, and after passing through a polarizing beam splitter 4 and a quarter-wave length plate 3, they are focused onto a recording layer of a disc 1 by an objective lens 2. The laser beam is reflected on the recording layer and becomes a reflected pulsed laser train having superimposed thereon an intensity change corresponding to a recording mark or space. The temporal change of the laser beam intensity corresponds to a pulsed read signal shown in FIG. 3. When the reflected pulsed laser train returns along the original path up to the polarizing beam splitter 4, it is then reflected and focused onto a photodiode 8 by a converging lens 7 and further converted into an electric current. This current is converted into a voltage signal by a current amplifier 10, and then converted into a digital signal by the AD converter 11. Then, the output of the AD converter 11 is inputted to the DA converter 12.

As shown in FIG. 6, the AD converter needs to be driven such that it samples the peak value of each pulse of a pulsed read signal (indicated in dashed line). Thus, the output of the HF oscillator is used as the drive clock of the AD converter and the DA converter. However, since there is a phase difference between the HF signal and the pulsed read signal due to delay arising in the process up to the photodiode and laser emission, this phase difference is adjusted using a variable delay line 16. Note that as stated in the "BACKGROUND OF THE INVENTION" section, FIG. 3 shows the case in which the bandwidth limitation due to the photodiode for reading and the current to voltage converter amplifier is nil. However, when there is a bandwidth limitation due to these elements, depending on its degree, it gives rise to extensions of individual pulse widths and decline of peak values. However, if the bandwidth is greater than a certain amount, almost the same signal as that shown in FIG. 3 can be obtained.

The DA converter holds a sampled peak value of a pulse for a period of one clock. Thus, the output of the DA converter has a step-like form (indicated in solid line) as shown in FIG. 6. Hereinabove, description has been made on the assumption that each of the AD converter and the DA converter performs ideal operation for simplicity of the description. Further, as for the output of the DA converter, since one clock is required for sending the output of the AD converter to the DA converter, the step-like signal is actually delayed than the pulsed read signal by one clock. However, in FIG. 6, each waveform is depicted without such delay taken into consideration so that the relationship between the waveforms can be clearly understood. This step-like waveform is a read signal containing distortion components. The distortion components are removed with a low-pass filter 17.

The output of the low-pass filter 17 is about equal to a read signal outputted from a pickup obtained with the conventional method except that the amplitude and SNR are improved. Thus, in the following decoding process, elements similar to those of the conventional optical disc drives can be used. That is, after the direct-current components are removed from the output of the low-pass filter 17 with a high-pass filter 20 and the signal is equalized by an analog equalizer 21, it is converted into a digital signal by an AD converter. The digitized read signal is synchronized with a clock by a PLL, and then decoded with a Viterbi decoder 25. The PLL is composed of an AD converter, a phase comparator 22, a loop filter 23, a DA converter, and a voltage controlled oscillator 24. The operation of the PLL is widely known, and thus is not detailed herein.

The signal processing system with the aforementioned configuration includes a plurality of analog components such as a high-pass filter, an analog equalizer, an AD converter, a DA converter, and a voltage controlled oscillator. Such analog components have a problem in that the characteristics of the individual components greatly differ from one another. In order to obviate the influence of such difference in characteristics of the individual components, it is often necessary to take an additional measure such as providing an adjusting function for the optical disc drive.

In typical optical disc drives, circuits that follow the AD converter of the PLL are integrated into a system LSI together with an error correction circuit and various control circuits. Such a system LSI is typically mounted on the main board. Thus, analog read signal need to be transmitted from a pickup to the main board. If an analog read signal is interrupted by noise from the outside or by signal crosstalk between adjacent signal lines, the quality of the read signal could deteriorate, resulting in the deteriorated error rate. Further, in high-speed reading, since the bandwidth of a read signal becomes wider, it is necessary to transmit even high-frequency components without phase distortion. Transmission lines that satisfy all of the aforementioned requirements tend to be not only difficult to design and mount but also expensive.

In the configuration example shown in FIG. 5, a pulsed read signal is once converted into a digital signal, and then converted into an analog signal again. Accordingly, the signal can be inputted into the conventional synchronous signal processor. In one configuration example described in Patent Document 1, a digital signal, which is obtained by AD-converting each pulse of a pulsed read signal, is inputted to a PLL and a decoding signal processing system. In this case, the HF emission frequency is set to be completely equal to the channel clock or to a frequency that is equal to an integral multiple of the channel clock. However, for optical disc drives, it is demanded that the read data transfer rate be variable over a wide range according to circumstances. However, the HF frequency cannot be freely changed because it is constrained under the conditions for suppressing laser noise. Thus, if the HF frequency is fixed at a given value, a problem will arise that the variable range of the read data transfer rate is restricted. It is thus highly probable that inconvenience would arise when reading is performed at a CAV (constant angular velocity).

According to the present invention, in order to minimize the analog components included in the optical disc apparatus, a laser is made to perform pulse emission, and the apparatus includes the following: means for obtaining a pulsed read signal, means for sampling the pulsed read signal based on the laser pulse emission frequency (carrier frequency) to thereby obtain a sampled pulsed read signal, and means for decoding data recorded on the optical disc from the sampled pulsed read signal. Further, in order to reduce the operating clock frequency of the decoding means, the apparatus also includes means for changing the sampling frequency of the pulsed read signal to be sampled to a different sampling frequency, and means for automatically setting the sampling frequency changing means based on the read rate.

The optical disc apparatus of the present invention includes a laser light source, a light-source driving portion that pulse-drives the laser light source, an optical system that irradiates an optical disc with a laser beam emitted from the laser light source, a photodetector that receives a laser beam reflected from the optical disc, an AD converter that samples and digitizes an output of the photodetector, means for converting an output of the AD converter into a serial bit stream, means for decoding data recorded on the optical disc from the serial bit stream, and means for transmitting the serial bit stream to the means for decoding data.

According to the present invention, an optical disc apparatus can be provided with which read signals with higher SNR than those of the current optical disc apparatuses can be obtained and in which analog components included in the read signal processing system can be minimized.

DESCRIPTION OF THE PREFERRED EMBODIMENTS

Figure 1:
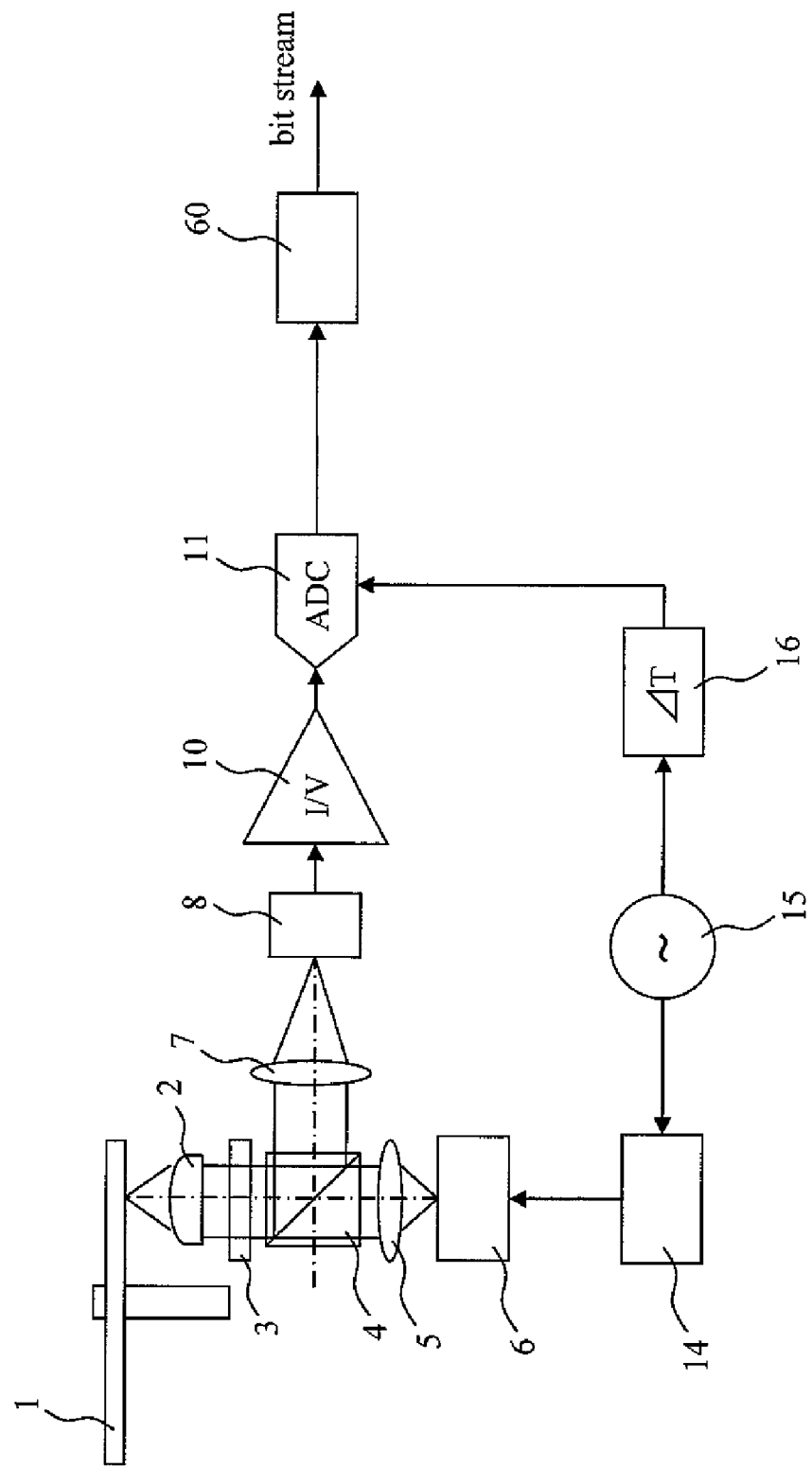
FIG. 1 shows one embodiment of an optical disc drive in accordance with the present invention.
Figure 2:
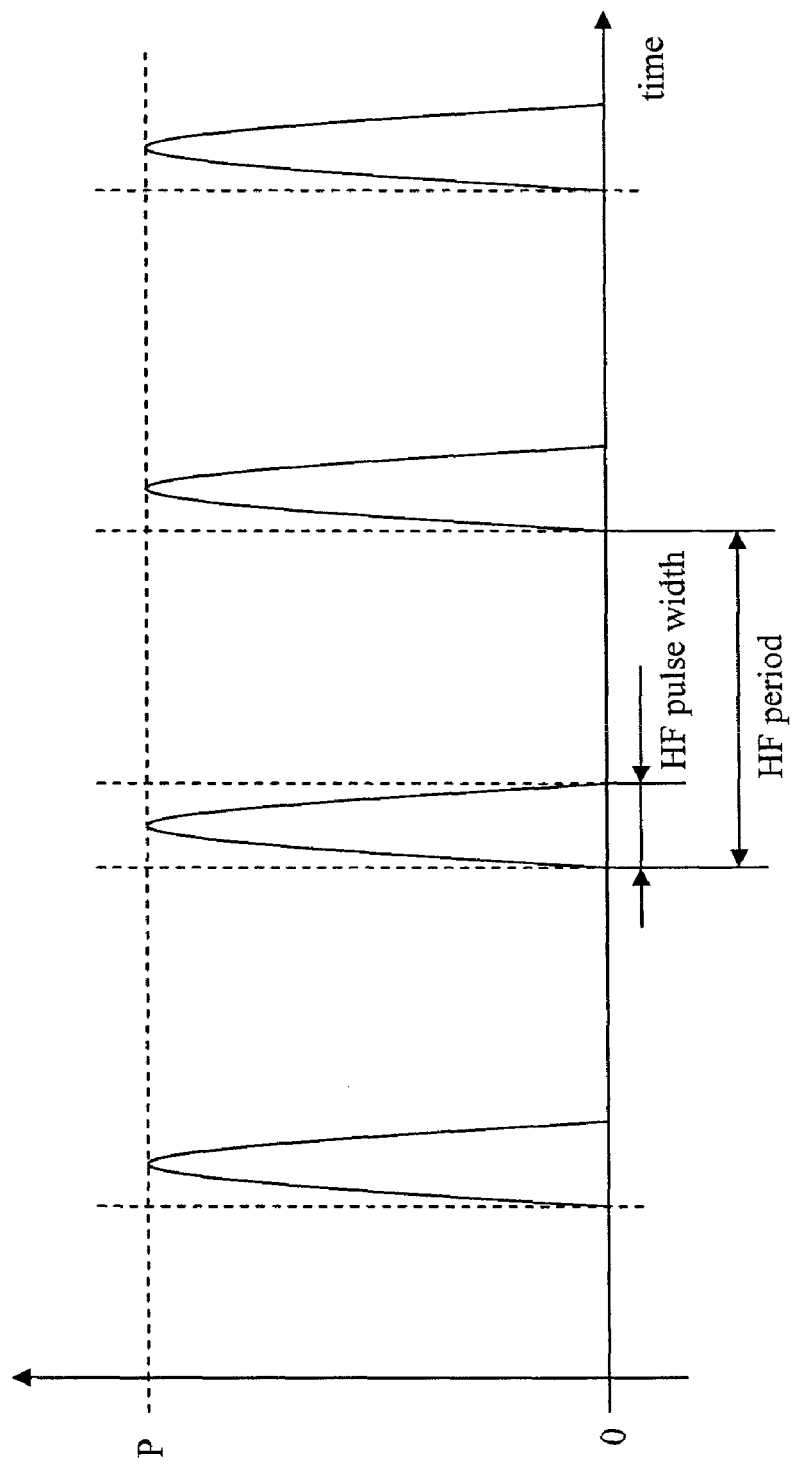
FIG. 2 shows the emission state of laser with a high-frequency wave superimposed thereon.

FIG. 1 shows an example of an optical disc drive of the present invention. A carrier is generated by an oscillator 15 and then inputted to a laser driver 14. The laser driver 14 generates a laser drive current by which the desired average laser power, peak power, and duty can be obtained, and inputs it to a laser diode 6. The laser driver 14 also controls the laser drive current such that the average laser output becomes constant. The output beam intensity of the laser diode changes with time as shown in FIG. 2.

Figure 3:
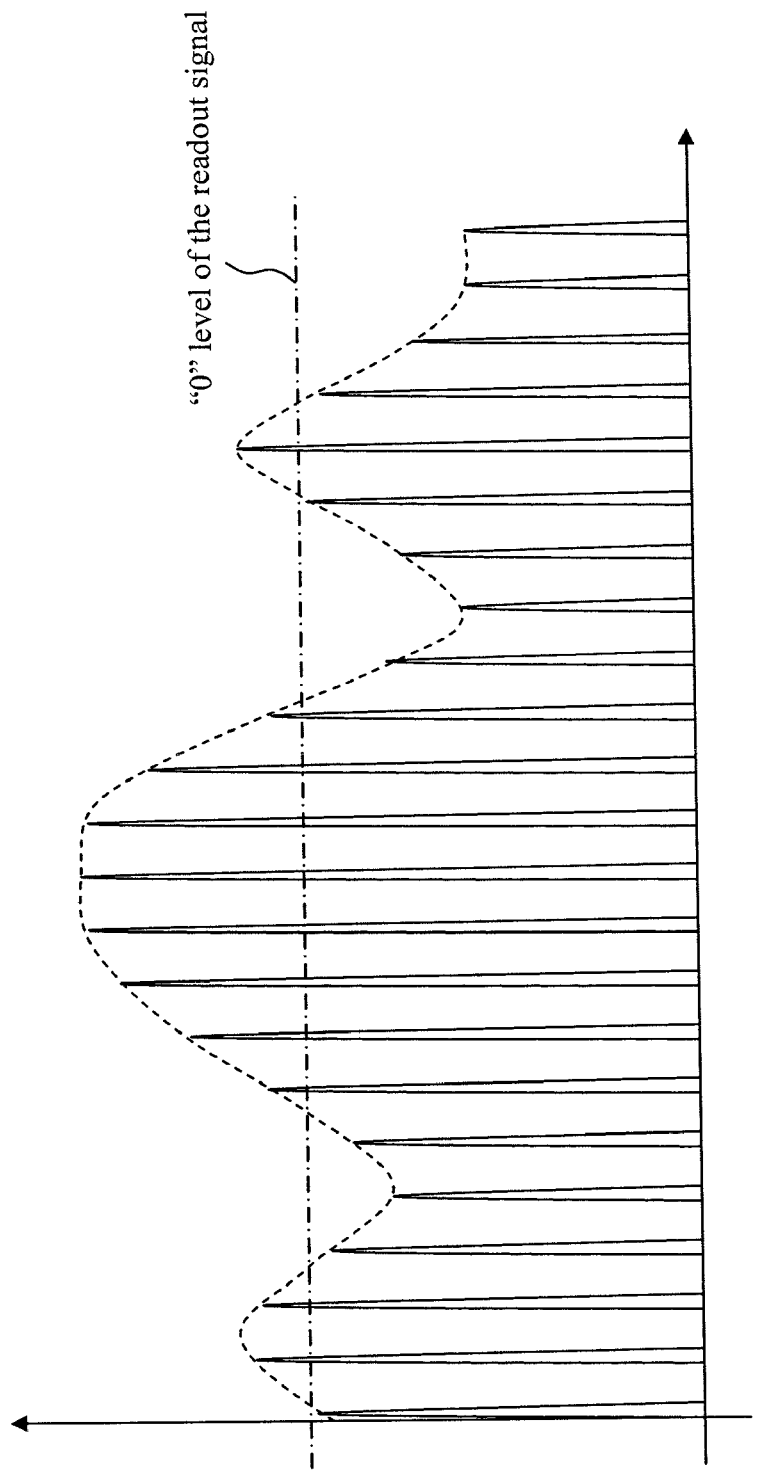
FIG. 3 illustrates a pulsed read signal.
Figure 4:
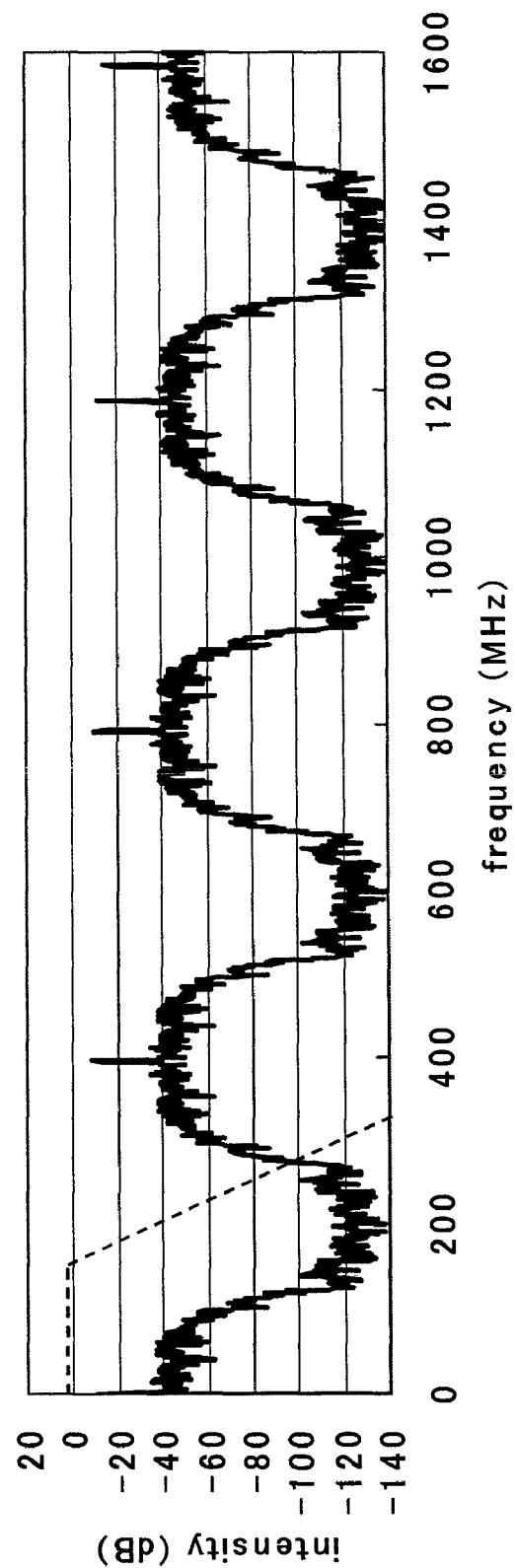
FIG. 4 shows a spectrum of a pulsed read signal.
Figure 6:
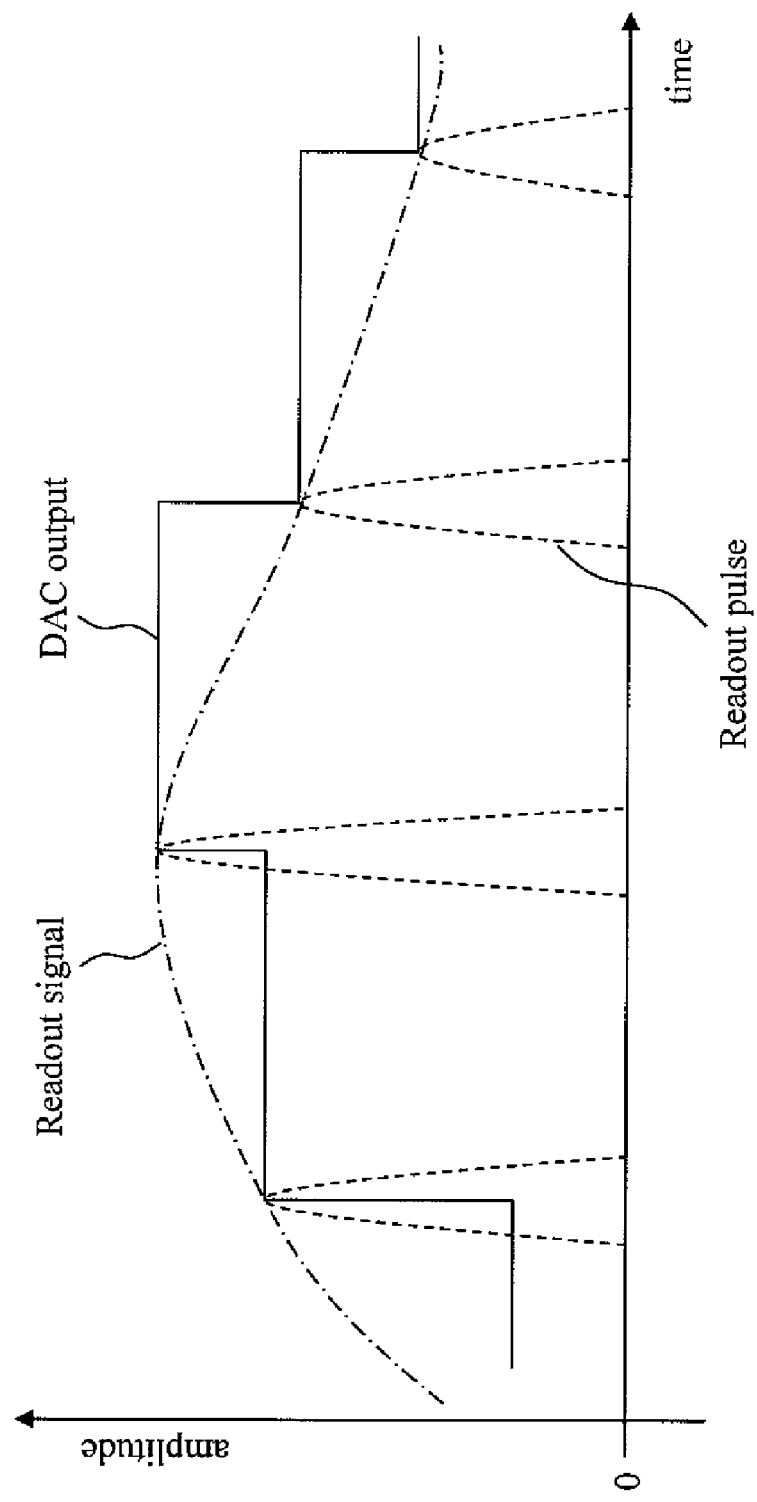
FIG. 6 illustrates conversion of a pulsed read signal into a continuous signal using an AD converter.

The laser beams are transformed into parallel beams by a collimator lens 5, and after passing through a polarizing beam splitter 4 and a quarter-wave length plate 3, they are focused onto a recording layer of a disc 1 by an objective lens 2. The laser beam is reflected on the recording layer and becomes a reflected pulsed laser train having superimposed thereon an intensity change corresponding to a recording mark or space. The temporal change of the laser beam intensity corresponds to a pulsed read signal shown in FIG. 3. When the reflected pulsed laser train returns along the original path up to the polarizing beam splitter 4, it is then reflected and focused onto a photodiode 8 by a converging lens 7 and further converted into an electric current. This current is converted into a voltage signal by a current amplifier 10, and is then converted into a digital signal by an AD converter 11. As shown in FIG. 6, the AD converter 11 needs to be driven such that it samples the peak value of each pulse of a pulsed read signal (indicated in dashed line). Thus, the output of the oscillator 15 is used as the drive clock of the AD converter 11. However, since there is a phase difference between the output of the oscillator and the pulsed read signal due to delay arising in the process up to the photodiode and laser emission, this phase difference is adjusted using a variable delay line 16. It should be noted that a signal obtained by sampling the peak of each pulse of a pulsed read signal will be referred to as a sampled pulsed read signal.

The pulsed read signal is converted into a digital signal and inputted into a decoder 60. The decoder 60 decodes the pulsed read signal to a bit string, namely, a digital signal recorded on the disc. Typically, the sampling frequency of a pulsed read signal differs from the channel clock frequency. That is, the decoder 60 is capable of decoding the original bit stream from a read signal that has been sampled asynchronously with the channel clock.

Figure 5:
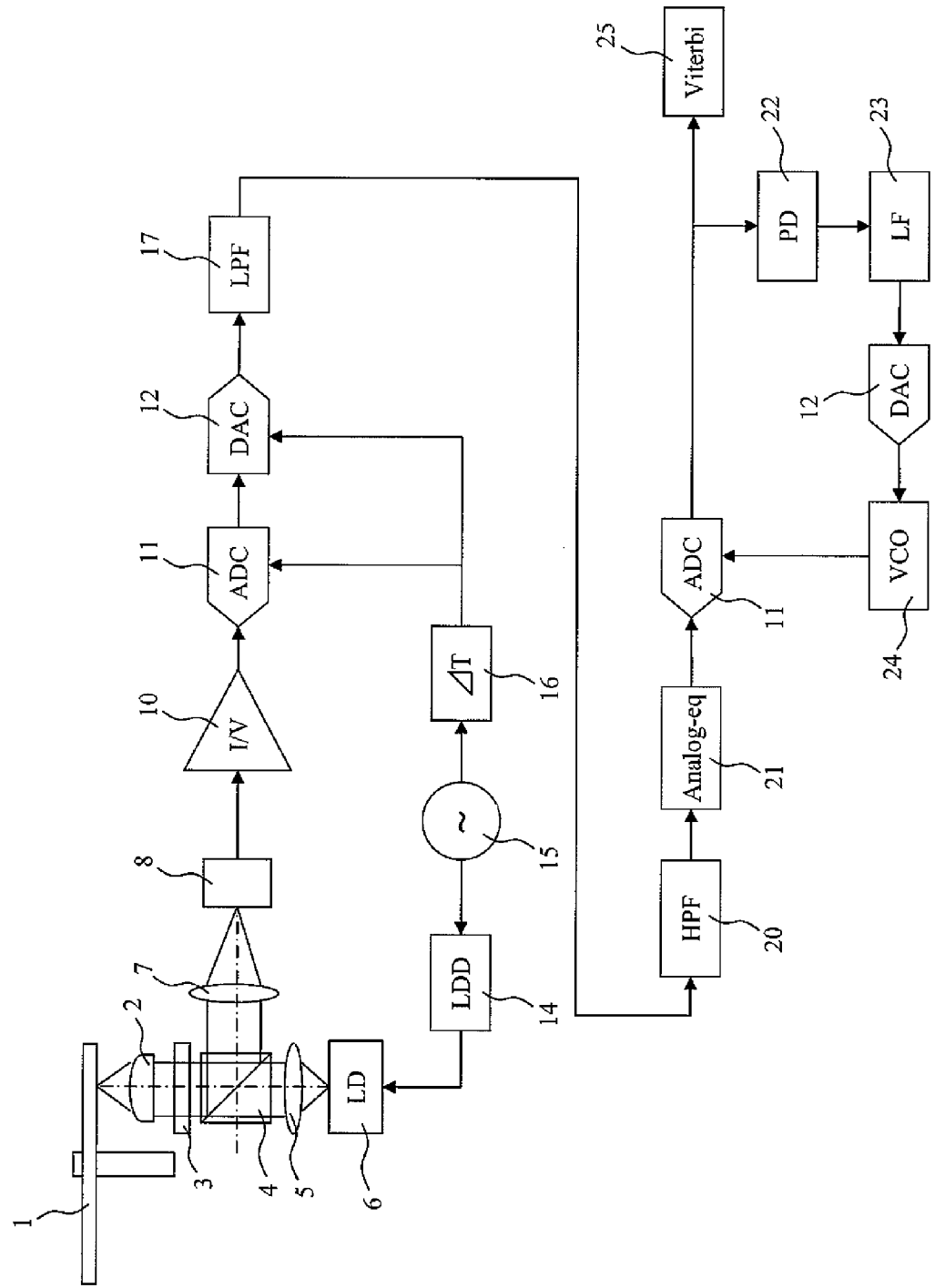
FIG. 5 shows a configuration example of an optical disc drive of the conventional technique.

Such a decoder can take various configurations. Among them is FIG. 7 which uses an asynchronous Viterbi decoder 37. It is a well-known fact for those skilled in the art that a Viterbi decoder is capable of performing highly accurate decoding by evaluating the similarity between a target signal and an input signal in terms of numerical values and selecting the most-likely waveform. A Viterbi decoder used for conventional optical disc drives such as the one shown in FIG. 5 operates synchronously with the channel clock. That is, each point of a target waveform is also generated synchronously with the channel clock. However, comparison between a target waveform and an input signal waveform can also be performed at a timing asynchronous with the channel clock, and thus, the asynchronous Viterbi decoder 37 can compare the waveforms at a timing asynchronous with the channel clock. Hereinafter, Viterbi decoding which is performed using a signal asynchronous with the channel clock will be referred to as asynchronous Viterbi decoding.

In order to generate a target waveform for asynchronous Viterbi decoding, it is necessary to estimate the frequency and the phase of the channel clock. This is performed by a timing detector 35. In data recorded on an optical disc such as a BD, a special code train called a sync-mark is inserted at certain bit interval. The timing detector estimates the frequency and the phase of the channel clock by analyzing the appearance cycle and the phase of the sync-marks, and generates a clock signal corresponding thereto. Such a clock signal is called a pseudo-channel clock. A target generator 36 supplies to the asynchronous Viterbi decoder 37 target levels corresponding to the phase of the channel clock estimated with the timing detector. The asynchronous Viterbi decoder 37 generates a target waveform based on the supplied targets and compares it with an input signal waveform to perform Viterbi decoding.

Figure 8:
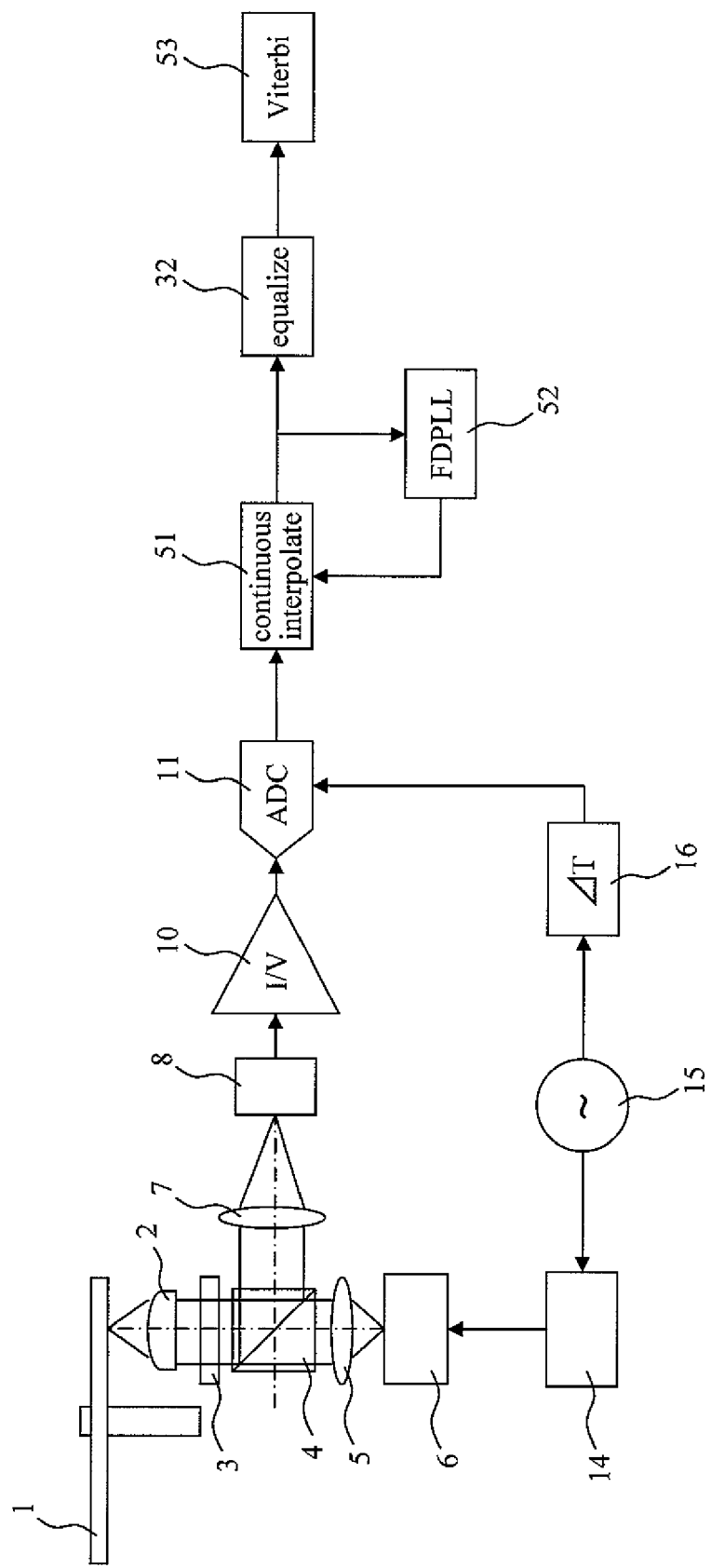
FIG. 8 shows a configuration example of an optical disc drive using a continuous interpolator.

FIG. 8 shows a configuration example in which a synchronous Viterbi decoder 53 is used as the decoder 60. In this case, a mechanism that synchronizes a read signal supplied to the Viterbi decoder with the channel clock is required. The output of the AD converter is not synchronized with the channel clock. In order to convert such an output into a signal synchronized with the channel clock, a synchronous circuit composed of a continuous interpolator 51 and a full-digitalized PLL circuit 52 is used in this example. An interpolator used in the configuration example of FIGS. 11, 12, or the like which is described later has a function of converting the sampling rate of an input signal to a fraction of a given integer within a limited range. In contrast, the continuous interpolator 51 used herein is like the one described in Non-Patent Document 4, for example, and is capable of changing the sampling rate of an input signal in sufficiently small steps. The full-digitalized PLL 52 corresponds to a group of a phase comparator, a loop filter, and a voltage controlled oscillator of an analog PLL, and includes a timing error detector for an output signal of the continuous interpolator and the channel clock, a loop filter, a synthesizer, and the like. Such a synchronous circuit composed of the continuous interpolator 51 and the full-digitalized PLL circuit 52 is detailed in Non-Patent Document 4. Thus, it will not be described in further detail here.

In the aforementioned embodiment, the AD converter is arranged on the pickup side and the digitized pulsed read signal can be transmitted to a system LSI on the main board. Thus, transmission of analog read signals between the pickup and the main board, which has conventionally been necessary, is not required. Further, in the configuration of FIG. 1, no analog components are included in the circuits following the AD converter. Thus, analog circuits are completely eliminated from the read signal processing system of the system LSI.

In conversion of a pulsed read signal into a digital signal, several bits (a word length) will naturally be required to represent one sample. Thus, the output of the AD converter is typically a parallel output of a binary signal. When such a signal is simply transmitted to the system LSI from the pickup, at least the same number of transmission lines as the word length will be required. This means that the number of signal lines on a flexible printed circuit that is typically used for connecting the pickup and the main board could increase, that is, the width of the flexible printed circuit could increase. Also, the number of pins that are required to input read signals into the system LSI could increase. It is highly probable that these will hinder reductions in size and cost of the apparatus which have been demanded in recent years.

Figure 9:
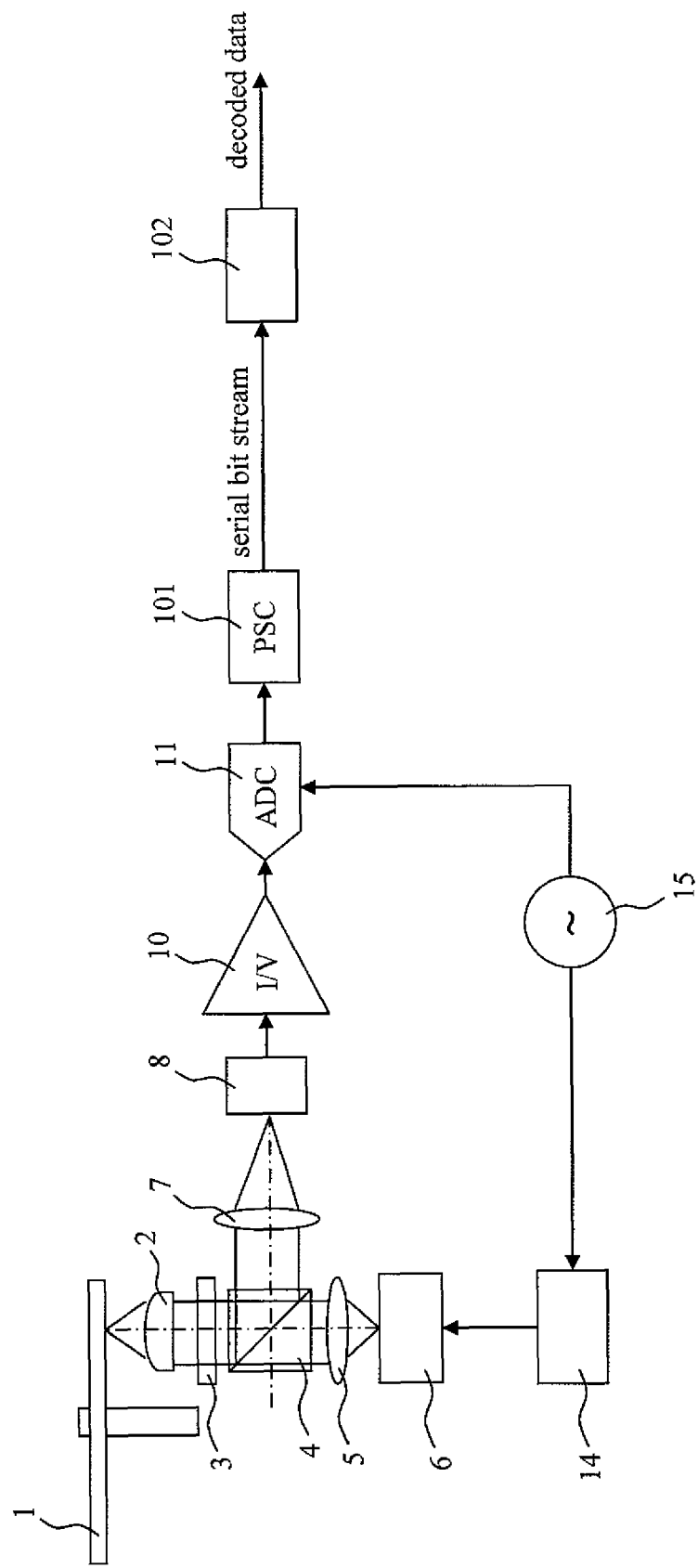
FIG. 9 illustrates a case in which the AD converter output is converted into a serial signal and then transferred to a system LSI.

In order to solve the aforementioned problems, there is provided a method of converting the parallel signal output of the AD converter into a serial signal. FIG. 9 shows an example of such a method. That is, the output of the AD converter is converted into a serial signal using a PS (parallel to serial) converter 101 before it is transmitted to a system LSI 102. Such a method does not significantly increase the number of pins that are required for the system LSI on the signal receiving side to receive read signals, nor does it significantly increase the number of signal lines of the flexible printed circuit. In this case, the clock frequency of a serial clock transmitted through the flexible printed circuit is an integral multiple of the carrier frequency.

Figure 10:
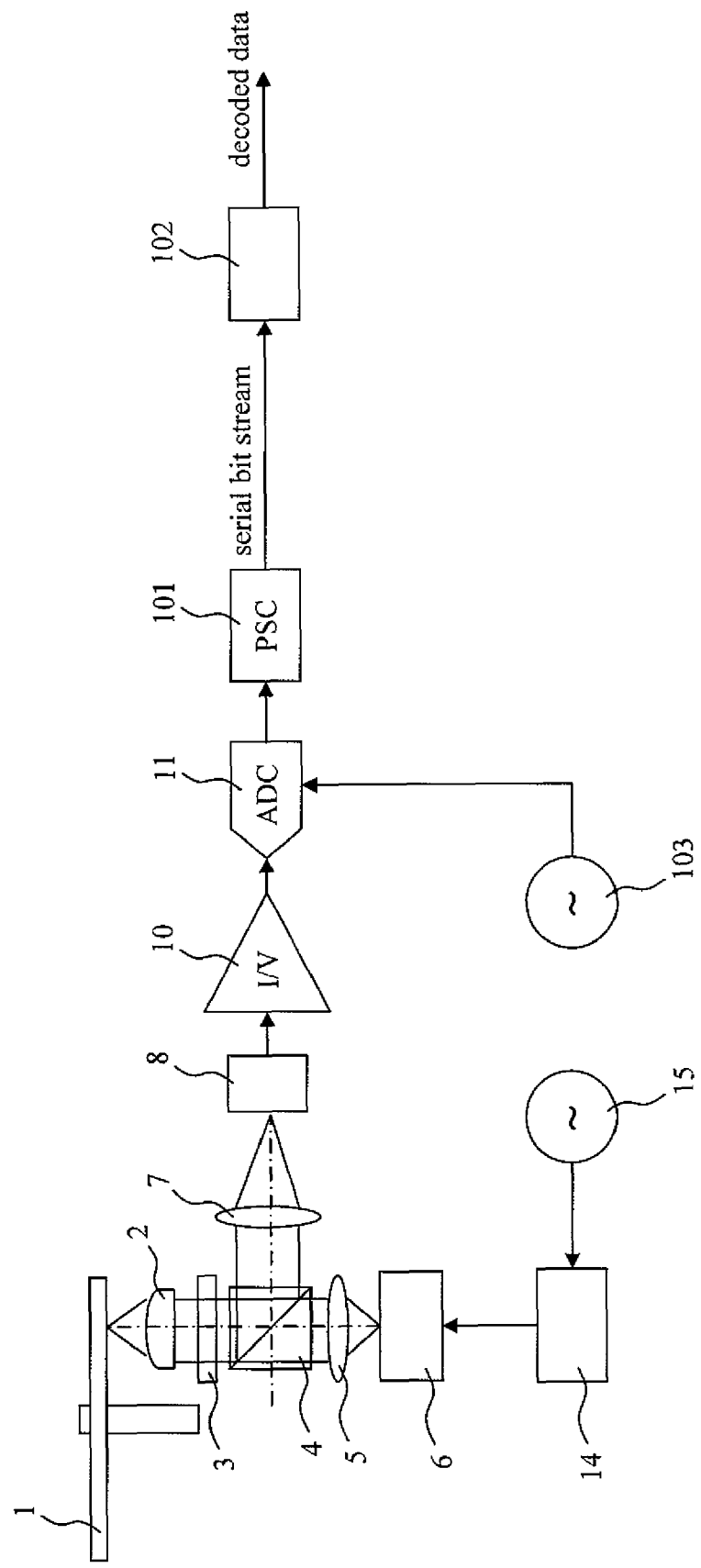
FIG. 10 shows a case in which the drive clock of an AD converter differs from the modulation frequency when the AD converter output is converted into a serial signal and then transferred to a system LSI

FIG. 9 is based on the system that performs MTD. However, it is obviously also possible, with the conventional optical disc drives, to transmit analog signals and reduce the size of the flexible printed circuit by arranging an AD converter on the pickup side and by digitally transmitting the AD-converted read signal. This is shown in FIG. 10. In this case, the drive clock of the AD converter is supplied from a sampling clock source 103 which is separate from the oscillator 15. Thus, the clock frequency of a serial signal transmitted through the flexible printed circuit is typically not an integral multiple of the carrier frequency.

When the parallel output of the AD converter is converted into a serial signal, the clock frequency will increase correspondingly. Since the carrier frequency is typically several hundred MHz, the clock frequency of the serial signal transmitted through the flexible printed circuit can possibly increase up to several GHz. However, it is not necessarily easy to electrically transmit such a high clock frequency signal through the flexible printed circuit. Thus, using an optical interconnect can also be an effective method.

Figure 7:
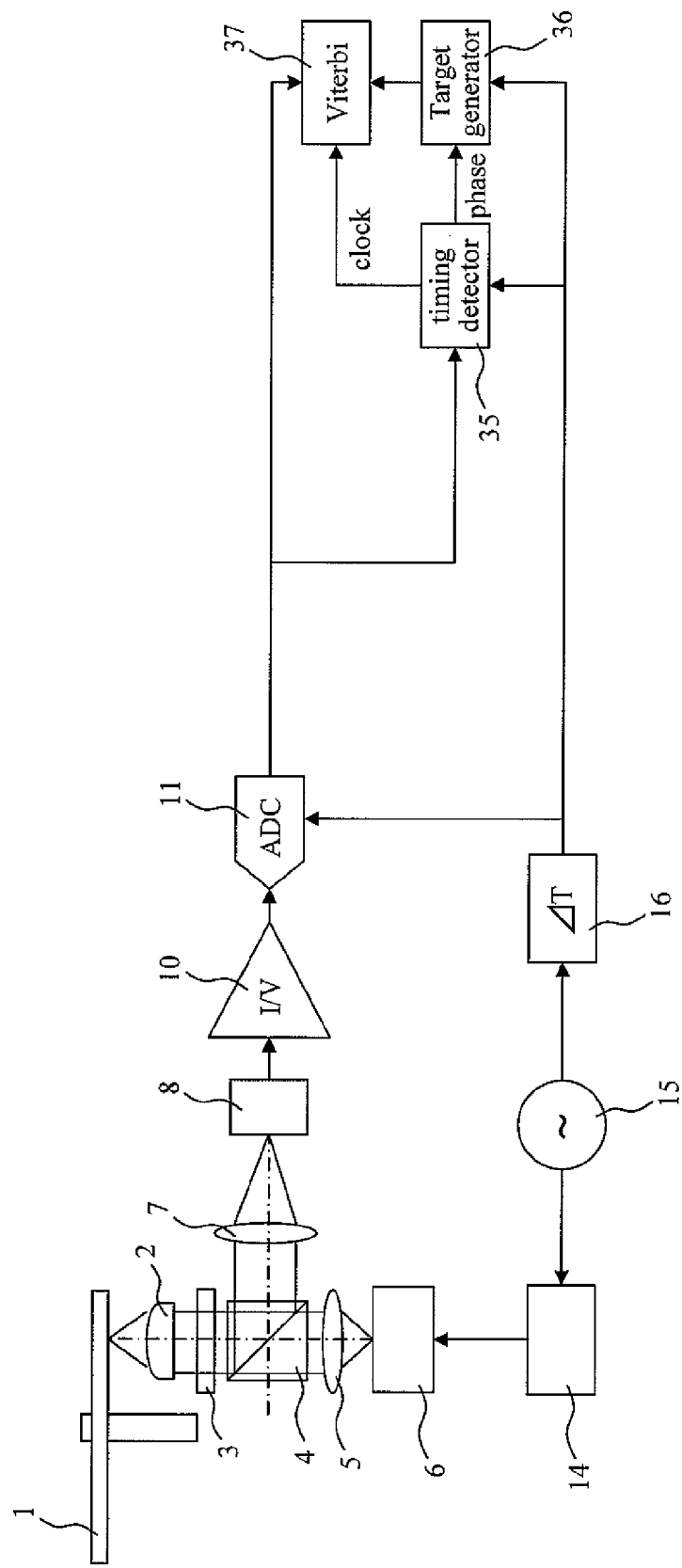
FIG. 7 shows a configuration example of an optical disc drive using an asynchronous Viterbi decoder.

Although the circuit configuration of each of FIGS. 1, 7, and 8 is the simplest configuration, the operating clock frequencies of the circuits following the AD converter are all equal and are also equal to the carrier frequency. For this reason, if the channel clock exceeds the carrier frequency, inconvenience would arise. For example, provided that BD is read at a rate of 10× at a carrier frequency of 400 MHz, since the channel clock is 660 MHz, the sampling rate of a signal supplied to the channel could be lower than the channel clock frequency. By contrast, when BD is read at a low rate, the sampling rate of a signal supplied to the channel could become unduly higher than the channel clock frequency. For example, in 2× reading, since the channel clock frequency is 132 MHz, the sampling frequency is greater than or equal to three times that required by the channel. Although the decoder circuit can be normally operated even under such conditions, the power consumption could increase because the circuit operates at an unduly high frequency, which is problematic.

Figure 11:
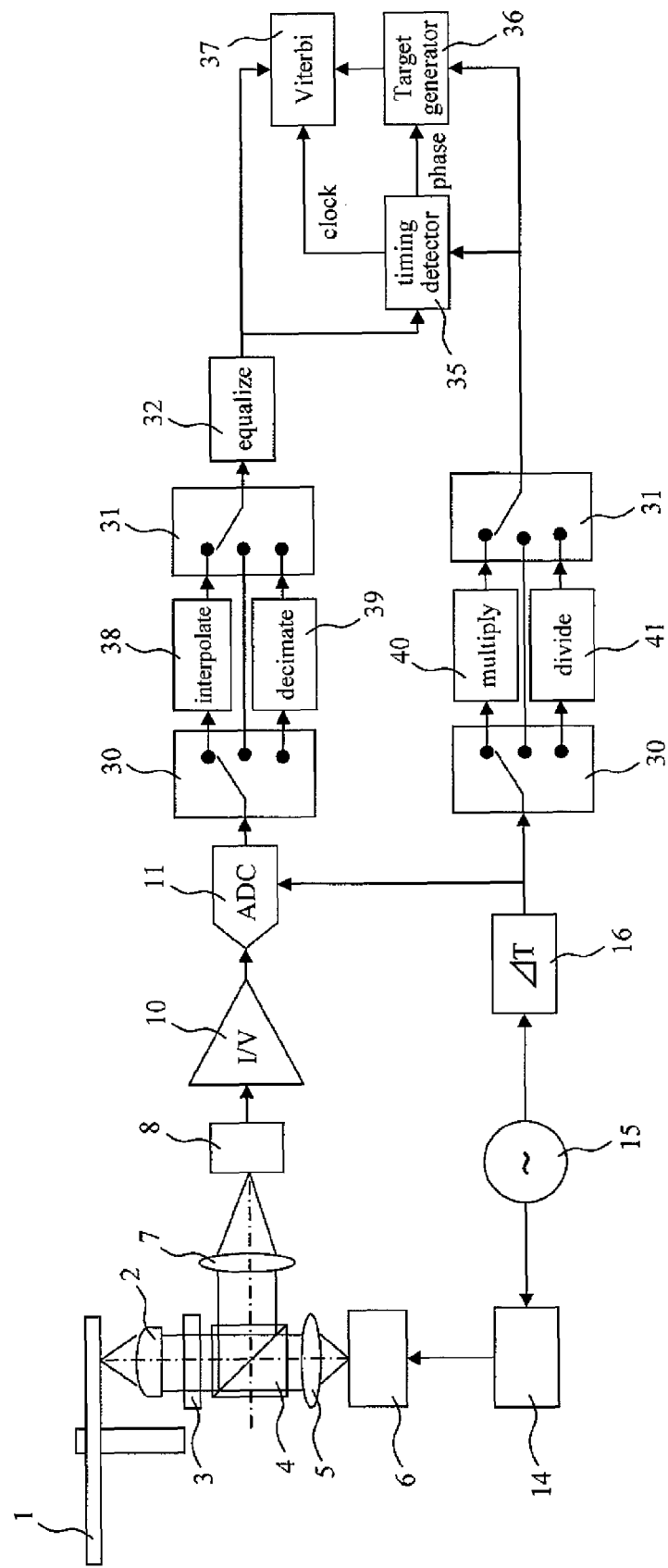
FIG. 11 shows a configuration example of an optical disc drive in which the difference between the channel clock and the modulation frequency is eased using an interpolator and a decimeter.

The configuration shown in FIG. 11 solves the aforementioned problems by being provided with means for adjusting the channel clock and the sampling rate of a signal inputted to the channel. That is, the sampling frequency is made closer as possible to the channel clock frequency by interpolating or decimating pulsed read signals that have been digitized with the AD converter, in accordance with the read rate. However, in such a case, care should be taken so that the sampling frequency does not become lower than the channel clock frequency. That is, when the sampling frequency of the signal immediately after the AD conversion is greater than or equal to twice of that of the channel clock, the sampling frequency is lowered by decimating the samples using a decimator 39. The decimator 39 shown in FIG. 11 can specify the sampling frequency to be lowered to ½ or ¼. In contrast, when the sampling rate of the signal immediately after the AD conversion is lower than the channel clock frequency, the interpolator 38 doubles the sampling frequency. Needless to say, when there is no need to change the sampling frequency, nothing is done and the interpolator 38 just transmits the signal to the following processor. As used herein, the interpolator 38 and the decimator 39 are the circuits that convert the sampling frequency of an input signal to an integral multiple and to a fraction of an integer, respectively. Such circuits are known for those skilled in the art and are disclosed in Non-Patent Document 2. Thus, detailed description of the configurations thereof will not be given below.

Selection of whether to directly transmit the signal immediately after the AD conversion or to change the sampling frequency using the decimator 39 or the interpolator 38 is carried out by selecting a signal path using a switcher 30 and a selector 31. That is, the switcher 30 has a function of sorting an input signal to one of a plurality of different terminals and the selector 31 has a function of selecting one of a plurality of input terminals for output. The read signal outputted from the selector 31 is equalized by a FIR (finite impulse response) equalizer 32, and then output to a timing detector 35 and an asynchronous Viterbi decoder 37. Although the coefficient of the FIR equalizer 32 is specified in advance, it is also possible to use an adaptive equalizer or the like.

When the sampling frequency of a read signal is changed, the drive clock frequency of the decoding system is also changed correspondingly. In order to double the clock frequency, a multiplier 40 is used, and in order to lower the clock frequency to ½ or ¼, a divider 41 is used. Selection of whether to transmit the clock as it is or to change the clock frequency using the divider or the multiplier is carried out by selecting a signal path using a switcher 30 and a selector 31 as is the case with the selection of signals.

In the configuration of FIG. 11, sampling frequency change of the read signal inputted to the FIR equalizer 32 by means of the decimator 39 or the interpolator 38 is limited to a power of two. Thus, the configuration can be simple. However, such a configuration can cause a large discrepancy between the sampling frequency and the channel clock frequency depending on the read rate. In such a case, since the decoding system of this system is originally configured to operate at a clock frequency higher than the channel clock frequency, the decoding system could operate at a clock frequency that is even higher than the channel clock frequency. This is disadvantageous in terms of power consumption and circuit mounting.

Figure 12:
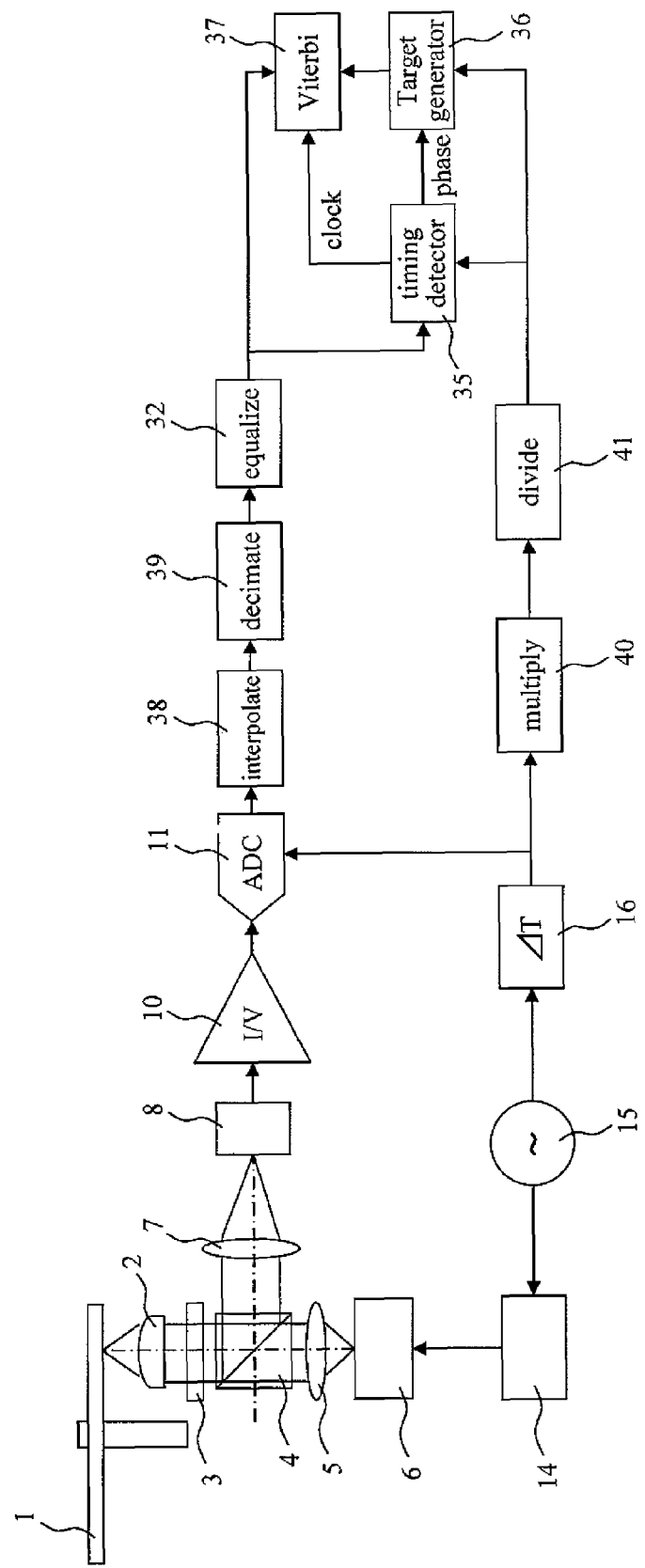
FIG. 12 shows another configuration example of an optical disc drive in which the difference between the channel clock and the modulation frequency is eased using an interpolator and a decimeter.

The configuration shown in FIG. 12 reduces the aforementioned problems. This configuration is characterized in that the interpolator 38 and the decimator 39 are connected in series. It should be noted that the interpolator 38 and the decimator 39 used herein inserts new samples so that the sampling frequency of a signal is multiplied by an integer, or decimates samples so that the sampling frequency of a signal becomes a fraction of an integer. In addition, the clock supplied to the decoding system is also multiplied or divided by the same ratio as the sampling frequency of the read signal, using the multiplier 40 and the divider 41 connected in series. By appropriately selecting the multiplication factor and division of such frequencies, it is possible to minimize the discrepancy between the sampling frequency of the read signal and the channel clock frequency.

Pulsed read signals contain large direct-current components. Such direct-current components are unnecessary for the decoding system, and can even be detrimental depending on the mounted configuration of the circuit of the decoding system. In current optical disc drives, the output of a pickup also contains direct-current components. Such direct-current components are first removed with a high-pass filter in many cases. For the high-pass filter, an analog filter that acts upon an analog signal before AD conversion is typically used. Unlike duty feedback slicers and the like, analog filters can surely remove almost all direct-current components without being influenced by the operating conditions of the PLL. However, it is naturally impossible to use an analog filter for pulsed read signals. Thus, when there is a need to remove direct-current components, the configuration shown in FIG. 13 can be used.

Figure 13:
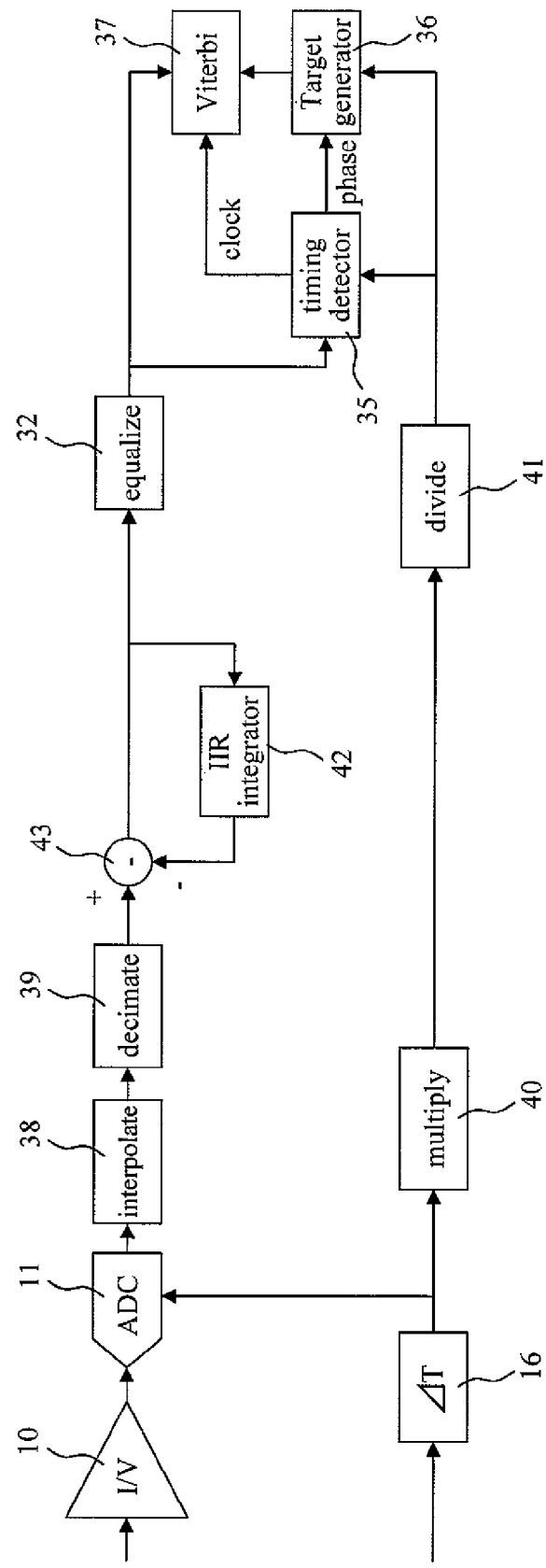
FIG. 13 shows a configuration example of an optical disc drive having means for removing direct-current components.

FIG. 13 is a representation in which part of the components in the configuration of FIG. 12 that is not necessary for the description of the removal of direct-current components is omitted. Herein, a feedback loop using an HR (infinite impulse response) integrator 42 is used for removing direct-current components. That is, the output of the IIR integrator 42 is subtracted from the pulsed read signal using a subtracter 43. The input of the IIR integrator 42 has a value obtained by subtracting the output of the IIR integrator from the pulsed read signal. That is, a feedback loop is formed. The output of the IIR integrator 42 approaches asymptotically to the mean value of the pulsed read signal, namely, zero level of the read signal. Thus, unnecessary direct-current components are almost removed from the output of the feedback loop.

Figure 14:
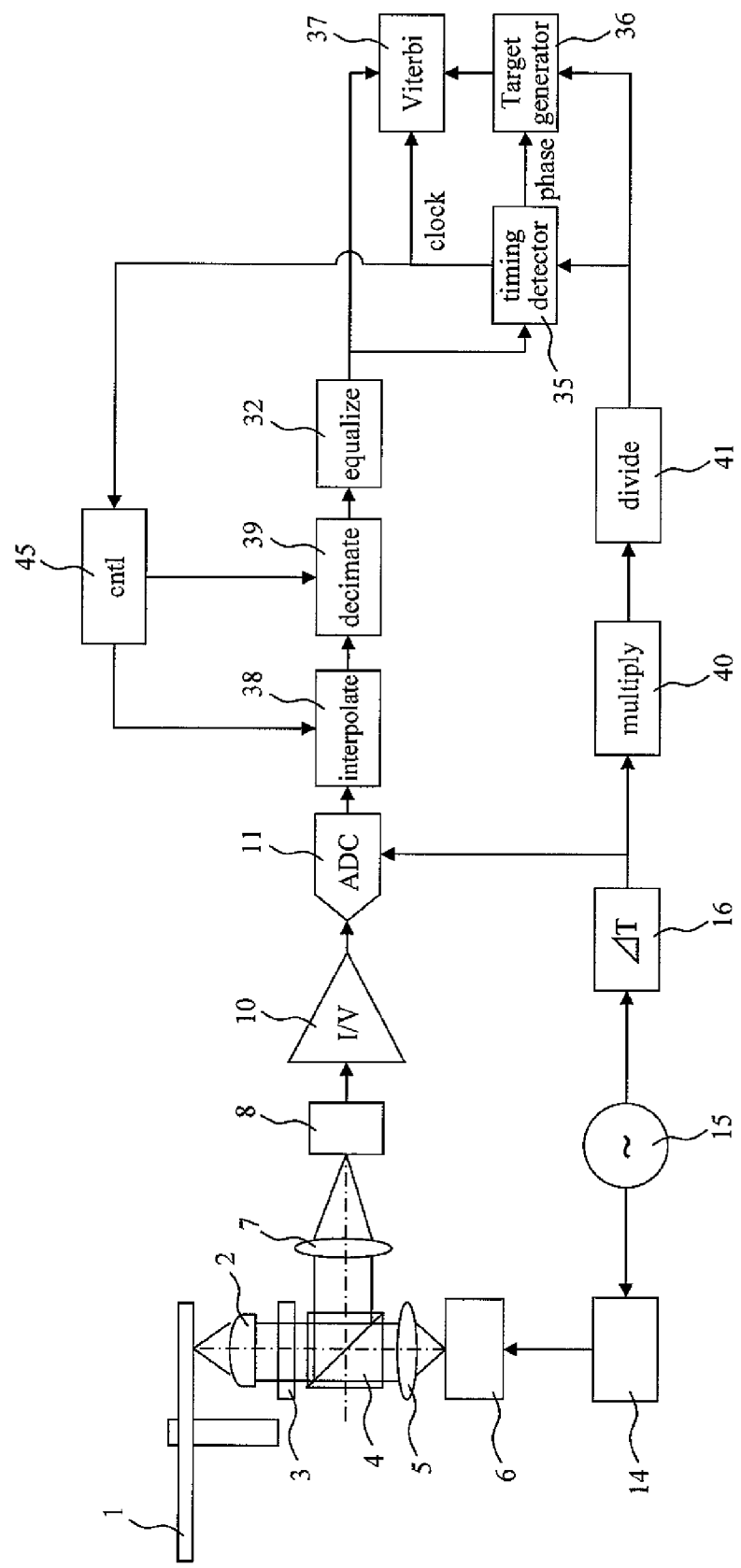
FIG. 14 shows a configuration example of an optical disc drive in which an interpolator and a decimeter can be automatically set.

Determination of whether to or not to use the interpolator 38 and the decimator 39 in FIG. 11, or the setting of the interpolator 38 and the decimator 39 in FIG. 12 is set by firmware that controls the operation of the optical disc drive. Patterns of the setting of such components may be determined in advance in accordance with the read rate. However, it is also possible to automatically set such components by detecting the read rate as shown in the example of FIG. 14. That is, since the channel clock is outputted from the timing detector 35, a controller 45 detects the read rate from the channel clock frequency. The controller 45 then sets the interpolator and the decimator in accordance with the read rate. When reading is performed in a constant angular velocity mode, the read rate changes with time because the read rate differs depending on the radius of a portion of the disc at which reading is performed. In this case, the read rate can become either higher or lower depending on the direction of the spiral of the disc. However, the controller 45 also detects changes in read rate, and avoids a circumstance in which a read signal supplied to the decoding system is in an under sampling state when the read rate becomes higher with time.

FIG. 14 might seem as if the controller 45 sets only the interpolator 38 and the decimator 39. However, this is only a schematic representation adapted for simplicity of the drawing. In practice, the controller 45 also sets the multiplier 40 and the divider 41 corresponding to the setting of the interpolator 38 and the decimator 39. Although the description above is the case in which a controller is added to the configuration shown in FIG. 12, it is obvious that the controller can similarly be added to the configuration shown in FIG. 11.

INDUSTRIAL APPLICABILITY

The present invention can be applied to optical disc drives in general.

EXPLANATION OF REFERENCE NUMERALS 1 optical disc
2 objective lens
3 quarter-wave length plate
4 polarizing beam splitter
5 collimator lens
6 laser diode
7 converging lens
8 photodiode
10 current amplifier
11 AD converter
12 DA converter
13 equalizer
14 laser driver
15 oscillator
16 variable delay line
17 low-pass filter
20 high-pass filter
21 analog equalizer
22 phase comparator
23 loop filter
24 voltage controlled oscillator
25 Viterbi decoder
30 switcher
31 selector
32 FIR equalizer
35 timing detector
36 target generator
37 asynchronous Viterbi decoder
38 interpolator
39 decimeter
40 multiplier
41 divider 42 IIR integrator
43 subtracter
45 controller
51 continuous interpolator
52 full-digitalized PLL
53 synchronous Viterbi decoder
60 decoder
101 PS converter
102 system LSI
103 sampling clock source

What is claimed is:

1. An optical disc apparatus comprising:
a laser light source;
a light-source driving portion configured to pulse-drive the laser light source;
an optical system configured to irradiate an optical disc with a laser beam emitted from the laser light source;
a means for converting information, which has been optically read from the optical disc by the laser beam irradiation, into an electrical pulsed read signal;
a means for converting the electrical pulsed read signal into a sampled pulsed read signal;
a means for decoding data recorded on the optical disc, based on the sampled pulsed read signal, said means including an asynchronous Viterbi decoder configured to operate with a clock asynchronous with a channel clock;
a means for estimating a frequency and a phase of the channel clock based on the sampled pulsed read signal;
a means for generating a target level with the use of the estimated value of the phase of the channel clock, the target level to be used by the asynchronous Viterbi decoder;
a means for adjusting the sampling frequency of the sampled pulsed read signal, to be close to the frequency of the channel clock; and
a controller configured to detect a read rate from the channel clock frequency, and then to set the means for adjusting the sampling frequency of the sampled pulsed read signal in accordance with the read rate.

2. The optical disc apparatus according to claim 1, further comprising:
a means for converting the sampled pulsed read signal into a signal synchronized with a channel clock, without a process of converting the sampled pulsed read signal into an analog signal.

3. The optical disc apparatus according to claim 1, further comprising:
a means for removing direct-current components included in the pulsed read signal.

4. The optical disc apparatus according to claim 1, further comprising:
a means for changing a sampling frequency of the pulsed read signal based on the estimated channel clock; and
a means for automatically setting a clock of the pulsed read signal such that it coincides with the changed sampling frequency of the pulsed read signal.

5. The optical disc apparatus according to claim 1, wherein the means for adjusting the sampling frequency of the sampled pulsed read signal to be close to the frequency of the channel clock includes an interpolator and a decimator.

6. The optical disc apparatus according to claim 1, wherein when the sampling frequency of a read signal is changed, the drive clock frequency of the decoding system is also changed, by use of a multiplier or a divider.

7. An optical disc apparatus comprising:
a laser light source;
a light-source driving portion configured to pulse-drive the laser light source;
an optical system configured to irradiate an optical disc with a laser beam emitted from the laser light source;
a photo-electric converting element, configured to convert information which has been optically read from the optical disc by the laser beam irradiation, into an analog electrical read signal;
an analog/digital converter, configured to convert the analog electrical read signal into a digital read signal;
a data decoding system, configured to decode data recorded on the optical disc, based on the digital read signal, the data decoding system including an asynchronous Viterbi decoder configured to operate with a clock asynchronous with a channel clock;
a timing detector, configured to estimate a frequency and a phase of the channel clock based on the digital read signal;
a target generator, configured to generate a target level with the use of the estimated value of the phase of the channel clock, the target level to be used by the asynchronous Viterbi decoder;
a sampling frequency adjustment system, configured to adjust the sampling frequency of the digital read signal, to be close to the frequency of the channel clock; and
a controller configured to detect a read rate from the channel clock frequency and then to set the sampling frequency adjustment system in accordance with the read rate.

8. The optical disc apparatus according to claim 7, further comprising:
a converter, configured to convert the digital read signal into a signal synchronized with a channel clock, without a process of converting the digital read signal into an analog signal.

9. The optical disc apparatus according to claim 7, further comprising:
a direct-current components removing system, configured to remove direct-current components included in the analog electrical read signal.

10. The optical disc apparatus according to claim 7, further comprising:
a means for changing a sampling frequency of the analog electrical read signal based on the estimated channel clock; and
a means for automatically setting a clock of the analog electrical read signal such that it coincides with the changed sampling frequency of the analog electrical read signal.

11. The optical disc apparatus according to claim 7, wherein the sampling frequency adjustment system includes an interpolator and a decimator.

12. The optical disc apparatus according to claim 7, wherein when the sampling frequency adjustment system changes the sampling frequency of a read signal, the drive clock frequency of the decoding system is also changed, by use of a multiplier or a divider.

13. An optical disc apparatus comprising:
a means for generating laser light;
a means for pulse-driving the means for generating laser light;
a means for irradiating an optical disc with laser light emitted from the means for generating laser light;
a means for converting information, which has been optically read from the optical disc by the laser beam irradiation, into an analog electrical read signal;

a means for converting the analog electrical read signal into a digital read signal;

a means for decoding data recorded on the optical disc based on the digital read signal, said means including an asynchronous Viterbi decoder configured to operate with a clock asynchronous with a channel clock;

a means for estimating a frequency and a phase of the channel clock based on the digital read signal;

a means for generating a target level with the use of the estimated value of the phase of the channel clock, the target level to be used by the asynchronous Viterbi decoder;

a means for adjusting the sampling frequency of the digital read signal, to be close to the frequency of the channel clock; and a means for detecting a read rate from the channel clock frequency and then setting the means for adjusting the sampling frequency of the digital read signal, in accordance with the read rate.

14. The optical disc apparatus according to claim 13, further comprising:

a means for converting the digital read signal into a signal synchronized with a channel clock, without a process of converting the digital read signal into an analog signal.

15. The optical disc apparatus according to claim 13, further comprising:

a means for removing direct-current components included in the analog electrical read signal.

16. The optical disc apparatus according to claim 13, further comprising:

a means for changing a sampling frequency of the analog electrical read signal based on the estimated channel clock; and a means for automatically setting a clock of the analog electrical read signal such that it coincides with the changed sampling frequency of the analog electrical read signal.

17. The optical disc apparatus according to claim 13, wherein the means for adjusting the sampling frequency of the digital read signal includes both an interpolator and a decimator.

18. The optical disc apparatus according to claim 13, wherein when the sampling frequency of a read signal is changed, the drive clock frequency of the decoding system is also changed, by use of a multiplier or a divider.

* * * * *